United States Patent [19]

Yamamoto

[11] Patent Number: 4,820,433
[45] Date of Patent: Apr. 11, 1989

[54] MAGNETIC POWDER FOR MAGNETIC RECORDING

[75] Inventor: Haruhisa Yamamoto, Kawasaki, Japan

[73] Assignee: Nippon Zeon Co., Ltd., Tokyo, Japan

[21] Appl. No.: 92,210

[22] Filed: Sep. 2, 1987

[30] Foreign Application Priority Data

Sep. 5, 1986 [JP] Japan ................. 61-208887
Sep. 5, 1986 [JP] Japan ................. 61-208888
Sep. 11, 1986 [JP] Japan ................. 61-214844
Sep. 19, 1986 [JP] Japan ................. 61-221612
Sep. 19, 1986 [JP] Japan ................. 61-221613

[51] Int. Cl.$^4$ ............................ C04B 35/26
[52] U.S. Cl. ..................... 252/62.57; 252/62.58; 252/62.59; 252/62.6; 252/62.62; 252/62.63; 252/62.64; 252/62.56
[58] Field of Search ............... 252/62.56, 62.57, 62.58, 252/62.59, 62.6, 62.62, 62.63, 62.64

[56] References Cited

U.S. PATENT DOCUMENTS 4,529,524  7/1985  Nagai et al. ............ 252/62.59
4,551,260  11/1985  Hayakawa et al. ....... 252/62.59
4,636,433  1/1987  Kubo et al. ............ 252/62.59
4,671,885  6/1987  Gaud et al. ............ 252/62.59

Primary Examiner—Jack Cooper
Attorney, Agent, or Firm—Sherman & Shalloway

[57] ABSTRACT

A magnetic powder for magnetic recording which has an average particle diameter of 0.01 to 0.3 micrometers and is represented by the following general composition formula

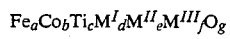

$$Fe_aCo_bTi_cM^I_dM^{II}_eM^{III}_fO_g$$

wherein $M^I$ represents at least one metal element selected from Ba, Sr, Ca and Pb, $M^{II}$ represents at least one element selected from Si, Sn, Mo and W, $M^{III}$ represents at least one element selected from Ni, Cu, V, Zr, La, Ce, Nd, Sm, Mn, Zn, Mg, P, Cr, In, Tl and Ge, a, b, c, d, e, f and g respectively represent the numbers of Fe, Co, Ti, $M^I$, $M^{II}$, $M^{III}$ and O atoms, a is a number of 8 to 11.8, b is a number of 0.05 to 2.0, c is a number of 0.05 to 2.0, d is a number of 0.5 to 3.0, e is a number of 0.001 to 3.0, and f is a number of 0.001 to 3.0, and g is the number of oxygen atoms satisfying the atomic valences of the other elements.

2 Claims, No Drawings

MAGNETIC POWDER FOR MAGNETIC RECORDING

This invention relates to a magnetic powder for magnetic recording. More specifically, this invention relates to a hexagonal ferrite magnetic powder composed of fine particles suitable for use in high-density magnetic recording media.

With a demand for higher density in magnetic recording in recent years, the perpendicular magnetic recording method by which a magnetic field is recorded in the thickness direction of a magnetic recording medium has attracted a great deal of attention. The magnetic material used in the perpendicular magnetic recording method should have an easy axis of magnetization in a direction perpendicular to the surface of the recording medium.

Hexagonal ferrites having uniaxial magnetocrystalline anisotropy, for example barium ferrite ($BaFe_{12}O_{19}$), are hexagonal plate crystals, and have an easy axis of magnetization in a direction perpendicular to the plate surface. They meet the aforesaid requirements as plastic-coated magnetic perpendicular recording tapes. The magnetic material should have a moderate coercive force, Hc, of usually about 300 to 2,000 Oe and the highest possible saturation magnetization, $\sigma s$, of at least 40 emu/g, and an average particle diameter of not more than 0.3 micrometer in view of recording wavelengths and at least 0.01 micrometer in view of super paramagnetism. The average particle diameter should be as small as possible within this range in view of noises.

Barium ferrite has a coercive force of at least 5,000 Oe which is too large for a magnetic material for magnetic recording. Hence, it has been proposed to reduce the coercive force by substituting Co and Ti for part of Fe [see, for example, Japanese Laid-Open Patent Publications Nos. 86103/1980 and 175707/1984, and IEEE Trans. on Magn., MAG-18, 16 (1982), p. 1122].

The coercive force required of a magnetic material for magnetic recording is about 300 to 2,000 Oe, and varies depending upon the use of the magnetic material. It is necessary therefore for the magnetic material to have a certain coercive force for each particular use. Thus, mere reduction of the coercive force is not enough, and it is necessary to control the coercive force to a certain fixed value depending upon the use of the magnetic material.

Magnetic powders of the prior art resulting from substituting Co and Ti for part of Fe have varying coercive forces and saturation magnetizations even when they have much the same proportions of the constituent elements, as shown in Table 1 below. This suggests that substituting Co and Ti for part of Fe results only in insufficient control of the coercive force.

TABLE 1

| Prior art | | Barium ferrite | Magnetic properties | |
|---|---|---|---|---|
| JOP | Example | composition | Hc (Oe) | $\sigma s$ (emu/g) |
| 149328/81 | Example 1 | $BaFe_{10.4}Co_{0.8}Ti_{0.8}$ | 870 | 47 |
| 60002/81 | Example | $BaFe_{10.4}Co_{0.8}Ti_{0.8}$ | 950 | 58 |
| 56326/82 | Example | $BaFe_{10.4}Co_{0.8}Ti_{0.8}$ | 1300 | 60 |
| 175707/84 | Comparative Example 2 | $BaFe_{10.5}Co_{0.75}Ti_{0.75}$ | — | 15 |

TABLE 1-continued

| Prior art | | Barium ferrite | Magnetic properties | |
|---|---|---|---|---|
| JOP | Example | composition | Hc (Oe) | $\sigma s$ (emu/g) |
| 95902/85 | Example 2 | $BaFe_{10.4}Co_{0.8}Ti_{0.8}$ | 680 | 39 |

Note:
JOP stands for Japanese Laid-Open Patent Publication

For the purpose of confirmation, the present inventor produced hexagonal ferrite magnetic powders for magnetic recording having Co and Ti substituted for part of Fe by using a co-precipitation method and a co-precipitation-flux method comprising mixing a flux with a co-precipitate obtained in an intermediate step of the co-precipitation method, firing the mixture at a high temperature, and thereafter removing the flux by washing with water. He repeated these methods under the same operating conditions, and attempted to determine whether the coercive forces of the resulting magnetic powders are controlled to a fixed value. It was found consequently that even under the same operation conditions, the coercive forces, saturation magnetizations and particle diameters of the resulting hexagonal ferrites varied from lot to lot, and the variations of the coercive forces were especially remarkable.

It would be concluded therefore that the coercive forces or saturation magnetizations of hexagonal ferrites having Co and Ti substituted for part of Fe are sensitively affected by the slight non-uniformity of conditions which cannot be controlled by an ordinary operation during production, or by very small amounts of impurities included in the ferrites during production.

It has been found therefore that the coercive force of a magnetic powder having Co and Ti substituted for part of Fe cannot be controlled by the ordinary coprecipitation method or co-precipitation-flux method.

The present inventor has made extensive investigations in order to develop a magnetic powder for perpendicular magnetic recording which is free from such a defect, and has consequently found that a magnetic powder represented by the following general composition formula is effective for perpendicular magnetic recording.

Thus, according to this invention, there is provided a magnetic powder for magnetic recording which has an average particle diameter of 0.01 to 0.3 micrometer and is represented by the following general composition formula $$Fe_aCo_bTi_cM^I{}_dM^{II}{}_eM^{III}{}_fO_g$$

wherein $M^I$ represents at least one metal element selected from Ba, Sr, Ca and Pb, $M^{II}$ represents at least one element selected from Si, Sn, Mo and W, $M^{III}$ represents at least one element selected from Ni, Cu, V, Zr, La, Ce, Nd, Sm, Mn, Zn, Mg, P, Cr, In, Tl and Ge, a, b, c, d, e, f and g respectively represent the numbers of Fe, Co, Ti, $M^I$, $M^{II}$, $M^{III}$ and O atoms, a is a number of 8 to 11.8, b is a number of 0.05 to 2.0, c is a number of 0.05 to 2.0, d is a number of 0.5 to 3.0, e is a number of 0.001 to 3.0, and f is a number of 0.001 to 3.0, and g is the number of oxygen atoms satisfying the atomic valences of the other elements.

It is critical in this invention that the numbers a to g of the individual constituent elements of the magnetic powder should be within the above-specified ranges. If these numbers are outside the specified ranges, it is difficult to obtain a magnetic powder having coercivity and saturation magnetization suitable for magnetic recording.

A preferred magnetic powder has such a composition that a is 8 to 11.8, b is 0.1 to 1.5, c is 0.1 to 1.5, d is 0.8 to 2.0, e is 0.005 to 2.0 and f is 0.005 to 2.0 and g is the number of oxygen atoms satisfying the atomic valences of the other elements. Depending upon the method of manufacture or the manufacturing conditions, the magnetic powder of the invention may contain particles which are not regular hexagonal plate crystals. But if the numbers of atoms a to g are within the above-specified ranges, the resulting magnetic powder can fully achieve the desired purpose.

When the manufacturing operation conditions are the same, the resulting magnetic powders of the invention hardly show variations in properties among production lots, but have coercive forces required for magnetic recording, excellent saturation magnetization, and a small average particle diameter. This is presumably because the magnetic powder has quite a different function as conventional magnetic powders containing Co and Ti.

The magnetic powder of this invention may be produced by various methods known in the art, for example the glass crystallization method, co-precipitation method, the flux method or the hydrothermal synthesis method. Particularly suitable methods are the co-precipitation method and the co-precipitation-flux method described hereinabove.

The production of the magnetic powder of this invention will be described with reference to the co-precipitation method and the co-precipitation-flux method.

Starting compounds of the individual metal elements constituting the magnetic powder of the invention include, for example, oxides, oxyhydroxides, hydroxides, salts (e.g., ammonium salts, nitrates, sulfates, carbonates, organic acid salts and alkali metal salts), halides, free acids, acid anhydrides and polyacids. Preferably, the starting compound for each metal element is dissolved in water to form an aqueous solution. Where it is convenient to dissolve it in an alkaline aqueous solution, the following alkaline aqueous solutions may be used. The alkaline component used in the alkaline aqueous solutions may be a water-soluble compound, for example, an alkali metal hydroxide or carbonate, ammonia and ammonium carbonate. Preferred alkalies are NaOH, $Na_2CO_3$, $NaHCO_3$, KOH, $K_2CO_3$, $NH_4OH$ and $(NH_4)_2CO_3$. A combination of a hydroxide and a carbonate is especially preferred.

The aqueous metal ion solution and the alkaline aqueous solution are mixed, and the resulting co-precipitate is fully washed with water and then separated by filtration. In the co-precipitation method, the resulting cake-like or slurry-like co-precipitate is dried, and fired at 600° to 1,100° C. for 10 minutes to 30 hours to obtain a hexagonal ferrite magnetic powder. In the co-precipitation-flux method, a suitable amount of a water-soluble flux is added to the washed co-precipitate. Examples of the water-soluble flux are alkali metal halides such as sodium chloride and potassium chloride, alkaline earth metal halides such as barium chloride and strontium chloride, sodium sulfate, potassium sulfate, sodium nitrate, potassium nitrate and mixtures of these. Water is evaporated from the mixture of the co-precipitate and the flux. The residue is dried and fired at 600° to 1,100° C. for 10 minutes to 30 hours. The water-soluble flux is separated by washing with water or an acidic aqueous solution. As required, the residue is further washed with water, and dried to form a hexagonal ferrite magnetic powder.

In the coprecipitation-flux method, the alkali salt formed by coprecipitation may also be used as the flux. In this case, hexagonal ferrite magnetic powder can be obtained by evaporating water from the mixture containing the coprecipitate and the alkali salt, drying the residue, and subjecting it to the same operation as above.

Although the production of the magnetic powder has been described with specific reference to the co-precipitation method and the coprecipitation-flux method, it should be understood that the magnetic powder may be produced by any other method if it has the general composition formula given hereinabove.

The magnetic powder of the invention consists of plate particles having an easy axis of magnetization on a hexagonal C plane. When it is produced under the same operating conditions, variations among production lots are very little. It has higher saturation magnetization than known magnetic powders having Co and Ti substituted for part of Fe. However, since the magnetic powder of the invention is obtained in a small average particle diameter, it is very suitable as a magnetic material for magnetic recording.

The following examples illustrate the present invention more specifically.

The coercive forces and saturation magnetizations in these examples were measured by using a vibrating sample magnetometer (VSM) at a maximum applied magnetic field of 10 KOe and a measuring temperature of 28° C. The average particle diameter was determined by measuring the maximum diameters of 400 particles from a micrograph of the magnetic powder taken through a transmission-type electron microscope and calculating an arithmetic average of these maximum diameters.

In the composition formula for each magnetic powder in these examples, the atomic ratio of the elements is expressed by that of the elements at the time of preparing the starting materials, and the indication of oxygen is omitted for simplification.

EXAMPLE 1

$BaCl_2.2H_2O$ 0.55 mole, 0.375 mole of $TiCl_4$, 0.375 mole of $CoCl_2.6H_2O$, 0.05 mole of $Cr(NO_3)_3$ and 5.25 moles of $FeCl_3.6H_2O$ were dissolved in 10 liters of distilled water in this sequence to form an aqueous solution (designated A). NaOH 17.5 moles, 4.72 moles of $Na_2CO_3$ and 0.2 mole of $Na_2SiO_3.9H_2O$ were dissolved in 15 liters of distilled water at room temperature to form an alkaline aqueous solution (designated B). The solution B was gradually added to the solution A heated at 50° C., and the mixture was stirred at 50° C. for 16 hours. After the stirring, the pH of the solution was 10.2. The resulting co-precipitate was separated by filtration, washed with water, and dried at 150° C. and fired at 880° C. for 1.5 hours in an electric furnace. The resulting barium ferrite is represented by the composition formula $Ba_{1.1}Fe_{10.5}Co_{0.75}Ti_{0.75}Si_{0.4}Cr_{0.1}$ (magnetic powder 1).

The above operation was repeated five times, and variations of the resulting magnetic powders in average particle diameter, coercive force and saturation magnetization among production lots were examined, and the results are shown in Table 2.

It is seen from Table 2 that the magnetic powders in accordance with this invention have very little variations among lots, and had smaller average particles and higher saturation magnetizations than the magnetic powders obtained in Comparative Example 1.

Barium ferrites having the composition formulae $Ba_{1.1}Fe_{10.5}Co_{0.75}Ti_{0.75}Cu_{0.2}Si_{0.4}$ (magnetic powder 2), $Ba_{1.1}Fe_{10.5}Co_{0.75}Ti_{0.75}Zn_{0.12}Si_{0.4}$ (magnetic powder 3), $Ba_{1.1}Fe_{10.5}Co_{0.75}Ti_{0.75}Sm_{0.1}Si_{0.4}$ (magnetic powder 4), and $Ba_{1.1}Fe_{10.5}Co_{0.75}Ti_{0.75}W_{0.2}Si_{0.4}$ (magnet powder 5) were obtained by operating in the same way as above except that 0.05 mole of $Cr(NO_3)_3.9H_2O$ in the solution A was replaced by 0.1 mole of $CuCl_2.2H_2O$, 0.06 mole of $ZnCl_4$, 0.05 mole of $Sm(NO_3)_3.6H_2O$ or 0.00833 mole of $(NH_4)_{10}W_{12}O_{41}.5H_2O$. This operation was also repeated five times, and the results are shown in Table 2.

TABLE 2

| Lot No. (magnetic powder) | Average particle diameter (micrometers) | Coercive force (Oe) | Saturation magnetization (emu/g) |
| --- | --- | --- | --- |
| 1-1 | 0.075 | 604 | 56.6 |
| 1-2 | 0.075 | 604 | 56.2 |
| 1-3 | 0.074 | 605 | 56.4 |
| 1-4 | 0.074 | 604 | 56.5 |
| 1-5 | 0.075 | 607 | 56.5 |
| 2-1 | 0.071 | 821 | 53.4 |
| 2-2 | 0.073 | 835 | 53.1 |
| 2-3 | 0.071 | 819 | 53.3 |
| 2-4 | 0.071 | 819 | 53.3 |
| 2-5 | 0.072 | 820 | 53.4 |
| 3-1 | 0.068 | 615 | 55.2 |
| 3-2 | 0.068 | 618 | 55.2 |
| 3-3 | 0.067 | 615 | 55.2 |
| 3-4 | 0.068 | 613 | 55.3 |
| 3-5 | 0.068 | 614 | 55.3 |
| 4-1 | 0.064 | 700 | 55.1 |
| 4-2 | 0.063 | 704 | 55.6 |
| 4-3 | 0.063 | 705 | 55.3 |
| 4-4 | 0.063 | 702 | 55.2 |
| 4-5 | 0.063 | 702 | 55.3 |
| 5-1 | 0.082 | 598 | 58.2 |
| 5-2 | 0.081 | 581 | 58.4 |
| 5-3 | 0.084 | 587 | 58.4 |
| 5-4 | 0.082 | 591 | 58.1 |
| 5-5 | 0.082 | 592 | 58.3 |

COMPARATIVE EXAMPLE 1

Barium ferrite was produced by the same method as in Example 1 except that sodium meta-silicate, chromium nitrate, cupric chloride, zinc chloride, samarium chloride and ammonium tungstate were not used. The resulting barium ferrite had the composition formula $Ba_{1.1}Fe_{10.5}Co_{0.75}Ti_{0.75}$ (magnetic powder 6).

The above operation as repeated five times, and variations of the resulting magnetic powders in average particle diameter, coercive force and saturation magnetization among production lots were examined. The results are shown in Table 3.

It is seen from Table 3 that the known magnetic powders have very great variations among the lots, and their coercive forces cannot be controlled by an ordinary operation as in the present invention.

TABLE 3

| Lot No. magnetic powder) | Average particle diameter (micrometers) | Coercive force (Oe) | Saturation magnetization (emu/g) |
| --- | --- | --- | --- |
| 6-1 | 0.27 | 386 | 41 |
| 6-2 | 0.23 | 542 | 40 |
| 6-3 | 0.25 | 336 | 36 |
| 6-4 | 0.36 | 483 | 41 |
| 6-5 | 0.28 | 229 | 38 |

EXAMPLE 2

The co-precipitate obtained during the production of the magnetic powder 1 in Example 1 was separated by filtration and washed with water. To the resulting cake-like coprecipitate slurry was added 400 g of NaCl as a flux, and after thorough mixing, water was evaporated from the mixture to dryness. The residue was fired at 870° C. for 1.5 hours in an electrical furnace. The fired product was washed with water until no soluble material existed. Subsequent filtration and drying gave barium ferrite (magnetic powder 1') having the same composition formul as given in Example 1.

From the stage of producing the cake of the coprecipitate, the same operation was repeated five times, and variations of the magnetic powders in average diameter, coercive force and saturation magnetization were examined. The results are shown in Table 4.

It is seen from Table 4 that according to this invention uniform magnetic powders can be obtained with little variations among production lots.

TABLE 4

| Lot No. (magnetic powder) | Average particle diameter (micrometers) | Coercive force (Oe) | Saturation magnetization (emu/g) |
| --- | --- | --- | --- |
| 1'-1 | 0.081 | 608 | 56.1 |
| 1'-2 | 0.084 | 605 | 56.0 |
| 1'-3 | 0.081 | 605 | 56.4 |
| 1'-4 | 0.082 | 605 | 56.2 |
| 1'-5 | 0.081 | 603 | 56.2 |

COMPARATIVE EXAMPLE 2

Using the co-precipitate obtained in the production of magnetic powder 6-1 in Comparative Example 1, the same operation as in Example 2 was repeated five times, and variations of the magnetic powders (6') in average particle diameter, coercive force and saturation magnetization among production lots were examined. The results are shown in Table 5.

It is seen from Table 5 that in spite of using the same co-precipitate, magnetic powders having the known compositions have very great variations among the production lots, and the coercive forces of the magnetic powders cannot be controlled as in the present invention (Example 2).

TABLE 5

| Lot No. (magnetic powder) | Average particle diameter (micrometers) | Coercive force (Oe) | Saturation magnetization (emu/g) |
| --- | --- | --- | --- |
| 6'-1 | 0.31 | 437 | 40 |
| 6'-2 | 0.29 | 286 | 36 |
| 6'-3 | 0.34 | 543 | 35 |
| 6'-4 | 0.41 | 331 | 31 |
| 6'-5 | 0.37 | 389 | 36 |

EXAMPLE 3

Solutions A and B were prepared in the same way as in the production of magnetic powder 1 in Example 1 except that the amount of NaOH was changed to 11.0 moles.

The solutions A and B heated to 50° C. were mixed and put in an evaporation dish. With thorough stirring, water was evaporated from the mixture until its water content became 50%. The residue was dried at 150° C., and fired at 870° C. for 1.5 hours in an electrical furnace. The fired product was washed with water until no soluble material existed. Subsequent filtration and drying gave barium ferrite (magnetic powder 1″) having the same composition formula as magnetic powder 1 in Example 1.

The resulting fine magnetic powder was plate like and had an average particle diameter of 0.083 micrometer, a coercive force of 607 Oe and a saturation magnetization of 56.5 emu/g.

The same operation was repeated five times. The average particle diameters, saturation magnetizations of the magnetic powders were the same as indicated above. Variations in coercive force among the production lots were as small as within ±1.5%.

EXAMPLES 4–74

Magnetic powders indicated in Table 6 were prepared by the same method as in Example 2 except that the $M^I$, $M^{II}$ and $M^{III}$ components and the compositions were changed as shown in Table 6. Chlorides were used as starting materials for $M^I$ component. Starting materials for the $M^{II}$ and $M^{III}$ components were sodium metasilicate or water glass for Si; chlorides for Sn, Cu, La, Ce, Nd, Sm, Mn, Zn, Mg and Ge; nitrates for Ni, Zr, Cr, In and Tl; and ammonium salts for Mo, W, V and P. The starting compounds for Si, Mo, V, P and W were used as a solution in an alkaline aqueous solution.

The same operation was repeated five times with respect to each of the magnetic powders shown in Table 6, and variations of the magnetic powders in average particle diameter, coercive force and saturation magnetization were examined. The variations among the production lots were within the same range as in Example 2 and very little.

TABLE 6

| Magnetic powder No. | Composition of the magnetic powder (atomic ratio) | Average particle diameter (micrometers) | Coercive forces (Oe) | Saturation magnetization (emu/g) |
|---|---|---|---|---|
| 7 | $Sr_{1.1}Fe_{10.5}Co_{0.75}Ti_{0.75}Si_{0.4}Cu_{0.1}$ | 0.082 | 840 | 55.2 |
| 8 | $Ca_{1.1}Fe_{10.2}Co_{0.6}Ti_{1.1}Si_{0.1}Cu_{0.05}$ | 0.113 | 723 | 51.9 |
| 9 | $Pb_{1.1}Fe_{10.5}Co_{0.7}Ti_{0.7}Si_{0.6}Cu_{0.1}$ | 0.098 | 875 | 52.3 |
| 10 | $Ba_{1.1}Fe_{10.5}Co_{0.75}Ti_{0.75}Sn_{0.1}Cu_{0.2}$ | 0.121 | 1051 | 53.4 |
| 11 | $Ba_{1.1}Fe_{10.5}Co_{0.75}Ti_{0.75}Sn_{0.4}Ni_{0.2}$ | 0.074 | 863 | 54.2 |
| 12 | $Ba_{1.1}Fe_{10.5}Co_{0.75}Ti_{0.75}Si_{0.3}V_{0.1}$ | 0.081 | 654 | 56.8 |
| 13 | $Ba_{1.1}Fe_{10.0}Co_{1.0}Ti_{1.0}Si_{0.05}Zr_{0.1}$ | 0.086 | 505 | 56.5 |
| 14 | $Ba_{1.1}Fe_{11.2}Co_{0.4}Ti_{0.4}Sn_{0.8}Zr_{0.08}$ | 0.105 | 1582 | 55.0 |
| 15 | $Ba_{0.5}Pb_{0.6}Fe_{10.2}Co_{0.9}Ti_{0.4}Sn_{0.5}Ni_{0.3}$ | 0.092 | 692 | 54.1 |
| 16 | $Ca_{0.2}Ba_{0.9}Fe_{10.5}Co_{0.7}Ti_{0.7}Si_{0.8}Ni_{0.1}$ | 0.137 | 544 | 54.3 |
| 17 | $Sr_{0.7}Ba_{0.4}Fe_{10.2}Co_{0.8}Ti_{0.8}Sn_{0.2}V_{0.2}$ | 0.081 | 677 | 54.9 |
| 18 | $Ba_{1.1}Fe_{10.5}Co_{0.75}Ti_{0.75}Si_{0.4}Sn_{0.1}Cu_{0.1}$ | 0.075 | 880 | 55.5 |
| 19 | $Ba_{1.1}Fe_{10.2}Co_{0.9}Ti_{0.9}Si_{0.2}Ni_{0.2}Cu_{0.05}$ | 0.073 | 721 | 55.0 |
| 20 | $Ba_{1.1}Fe_{10.5}Co_{0.75}Ti_{0.75}Si_{0.4}Cu_{0.1}V_{0.1}$ | 0.079 | 809 | 56.0 |
| 21 | $Ba_{1.1}Fe_{10.4}Co_{0.8}Ti_{0.8}Si_{0.5}Cu_{0.08}Zr_{0.4}$ | 0.090 | 605 | 52.7 |
| 22 | $Ba_{1.1}Fe_{10.5}Co_{0.75}Ti_{0.75}Sn_{0.1}Ni_{0.04}V_{0.1}$ | 0.081 | 733 | 56.6 |
| 23 | $Ba_{1.1}Fe_{10.5}Co_{0.75}Ti_{0.75}Si_{0.2}Sn_{0.1}Ni_{0.1}Zr_{0.1}$ | 0.082 | 753 | 56.3 |
| 24 | $Ba_{1.1}Fe_{10.5}Co_{0.75}Ti_{0.75}Si_{0.4}Ni_{0.1}Cu_{0.05}V_{0.1}$ | 0.082 | 796 | 57.1 |
| 25 | $Sr_{1.1}Fe_{10.5}Co_{0.75}Ti_{0.75}Si_{0.4}Cr_{0.1}$ | 0.093 | 851 | 53.4 |
| 26 | $Ca_{1.1}Fe_{10.4}Co_{0.7}Ti_{0.9}Si_{0.3}Cr_{0.1}$ | 0.076 | 593 | 50.7 |
| 27 | $Pb_{1.1}Fe_{10.5}Co_{0.6}Ti_{0.6}Si_{0.4}Cr_{0.1}$ | 0.071 | 608 | 51.7 |
| 28 | $Ba_{1.1}Fe_{10.5}Co_{0.65}Ti_{0.65}Si_{0.5}In_{0.2}$ | 0.084 | 602 | 55.1 |
| 29 | $Ba_{1.1}Fe_{10.5}Co_{0.75}Ti_{0.75}Si_{1.0}Tl_{0.2}$ | 0.082 | 750 | 54.7 |
| 30 | $Ba_{1.1}Fe_{10.5}Co_{0.75}Ti_{0.75}Sn_{0.2}Cr_{0.1}$ | 0.070 | 637 | 53.8 |
| 31 | $Ba_{1.1}Fe_{10.0}Co_{1.0}Ti_{0.8}Mo_{0.01}Tl_{0.2}$ | 0.071 | 505 | 54.6 |
| 32 | $Ba_{1.1}Fe_{11.0}Co_{0.5}Ti_{0.5}W_{0.4}In_{0.2}$ | 0.094 | 600 | 55.9 |
| 33 | $Ba_{0.5}Pb_{0.6}Fe_{10.5}Co_{0.75}Ti_{0.75}In_{0.1}Mo_{0.2}$ | 0.071 | 604 | 52.5 |
| 34 | $Ba_{1.1}Fe_{10.5}Co_{0.75}Ti_{0.75}Cr_{0.1}In_{0.1}Si_{0.5}$ | 0.076 | 550 | 53.5 |
| 35 | $Ba_{1.1}Fe_{10.5}Co_{0.75}Ti_{0.75}Cr_{0.05}Si_{0.4}Cu_{0.5}$ | 0.084 | 739 | 54.0 |
| 36 | $Ba_{1.1}Fe_{10.5}Co_{0.75}Ti_{0.75}In_{0.1}Ni_{0.1}Mo_{0.1}$ | 0.075 | 825 | 52.3 |
| 37 | $Sr_{1.1}Fe_{10.5}Co_{0.75}Ti_{0.75}Si_{0.4}Sm_{0.1}$ | 0.071 | 859 | 53.3 |
| 38 | $Ca_{1.1}Fe_{10.4}Co_{0.75}Ti_{0.75}Si_{0.5}Sm_{0.2}$ | 0.066 | 841 | 52.9 |
| 39 | $Pb_{1.1}Fe_{10.8}Co_{0.6}Ti_{0.6}Si_{0.5}Sm_{0.2}$ | 0.081 | 1200 | 54.6 |
| 40 | $Ba_{1.1}Fe_{10.5}Co_{0.7}Ti_{0.7}Si_{0.4}Nd_{0.1}$ | 0.077 | 833 | 51.9 |
| 41 | $Ba_{1.1}Fe_{10.0}Co_{1.0}Ti_{1.0}Si_{0.6}Ce_{0.2}$ | 0.064 | 644 | 50.5 |
| 42 | $Ba_{1.1}Fe_{10.2}Co_{0.9}Ti_{0.9}Si_{0.6}La_{0.05}$ | 0.068 | 730 | 52.1 |
| 43 | $Ba_{0.5}Pb_{0.6}Fe_{10.8}Co_{0.9}Ti_{0.9}Si_{0.1}Sm_{0.1}$ | 0.073 | 725 | 50.9 |
| 44 | $Ba_{1.1}Fe_{10.0}Co_{0.9}Ti_{0.9}Si_{0.4}Nd_{0.05}Sm_{0.1}$ | 0.075 | 663 | 52.7 |
| 45 | $Ba_{1.1}Fe_{10.6}Co_{0.8}Ti_{0.8}Si_{0.4}Sm_{0.1}Ni_{0.1}$ | 0.066 | 707 | 53.4 |
| 46 | $Ba_{1.1}Fe_{10.5}Co_{0.75}Ti_{0.75}Mo_{0.1}Nd_{0.1}$ | 0.072 | 791 | 52.0 |
| 47 | $Ba_{1.1}Fe_{11.0}Co_{0.5}Ti_{0.5}W_{0.3}Ce_{0.1}$ | 0.070 | 821 | 54.4 |
| 48 | $Sr_{1.1}Fe_{10.5}Co_{0.75}Ti_{0.75}Si_{0.4}Zn_{0.12}$ | 0.082 | 793 | 52.2 |
| 49 | $Ca_{1.1}Fe_{10.4}Co_{0.7}Ti_{1.0}Si_{0.2}Zn_{0.07}$ | 0.094 | 841 | 53.6 |
| 50 | $Pb_{1.1}Fe_{10.8}Co_{0.6}Ti_{0.6}Si_{0.6}Zn_{0.2}$ | 0.095 | 558 | 52.8 |
| 51 | $Ba_{1.1}Fe_{10.5}Co_{0.65}Ti_{0.65}Si_{0.1}Mn_{0.1}$ | 0.076 | 657 | 53.1 |
| 52 | $Ba_{1.1}Fe_{11.0}Co_{0.5}Ti_{0.5}Si_{0.4}Mg_{0.1}$ | 0.072 | 680 | 54.5 |
| 53 | $Ba_{0.5}Pb_{0.6}Fe_{10.5}Co_{0.75}Ti_{0.75}Si_{0.5}Zn_{0.2}$ | 0.082 | 666 | 52.6 |
| 54 | $Ba_{1.1}Fe_{10.5}Co_{0.75}Ti_{0.75}Si_{0.4}Mn_{0.05}Zn_{0.1}$ | 0.068 | 606 | 55.5 |

TABLE 6-continued

| | | Properties of the magnetic powder | | |
|---|---|---|---|---|
| Magnetic powder No. | Composition of the magnetic powder (atomic ratio) | Average particle diameter (micrometers) | Coercive forces (Oe) | Saturation magnetization (emu/g) |
| 55 | $Ba_{1.1}Fe_{10.5}Co_{0.75}Ti_{0.75}Si_{0.4}W_{0.05}Zn_{0.2}$ | 0.077 | 623 | 54.3 |
| 56 | $Ba_{1.1}Fe_{10.5}Co_{0.75}Ti_{0.75}Si_{0.4}Mn_{0.1}Cu_{0.2}$ | 0.074 | 690 | 52.3 |
| 57 | $Ba_{1.1}Fe_{10.4}Co_{0.8}Ti_{0.8}W_{0.4}Ni_{0.1}$ | 0.071 | 741 | 54.3 |
| 58 | $Ba_{1.1}Fe_{10.2}Co_{0.9}Ti_{0.9}W_{0.1}Cu_{0.05}$ | 0.073 | 867 | 53.2 |
| 59 | $Ba_{1.1}Fe_{10.0}Co_{1.0}Ti_{1.0}Mo_{0.6}V_{0.1}$ | 0.067 | 550 | 52.6 |
| 60 | $Ca_{0.5}Ba_{0.6}Fe_{10.5}Co_{0.7}Ti_{0.7}Mo_{0.1}Ge_{0.05}$ | 0.113 | 596 | 56.2 |
| 61 | $Sr_{0.5}Ba_{0.6}Fe_{11.2}Co_{0.4}Ti_{0.4}W_{1.0}V_{0.4}$ | 0.120 | 865 | 53.7 |
| 62 | $Ba_{1.1}Fe_{10.5}Co_{0.75}Ti_{0.75}Mo_{0.2}Ni_{0.1}Cu_{0.3}$ | 0.078 | 1255 | 53.5 |
| 63 | $Ba_{1.1}Fe_{10.5}Co_{0.75}Ti_{0.75}W_{0.2}Si_{0.4}Cu_{0.3}$ | 0.082 | 651 | 55.1 |
| 64 | $Ba_{1.1}Fe_{10.5}Co_{0.75}Ti_{0.75}W_{0.1}Si_{0.3}Ge_{0.05}$ | 0.090 | 604 | 56.0 |
| 65 | $Ba_{1.1}Fe_{10.5}Co_{0.75}Ti_{0.75}Mo_{0.1}Si_{0.2}Ni_{0.2}$ | 0.071 | 718 | 56.2 |
| 66 | $Ba_{1.1}Fe_{10.5}Co_{0.75}Ti_{0.75}Mo_{0.2}Ge_{0.1}Cu_{0.1}V_{0.1}$ | 0.091 | 837 | 56.4 |
| 67 | $Ba_{1.1}Fe_{10.5}Co_{0.75}Ti_{0.75}Mo_{0.1}P_{0.05}$ | 0.084 | 543 | 55.8 |
| 68 | $Ba_{0.95}Fe_{10.5}Co_{0.8}Ti_{0.5}W_{0.2}Zr_{0.2}$ | 0.077 | 602 | 56.1 |
| 69 | $Ba_{0.85}Ca_{0.2}Fe_{11.0}Co_{0.5}Ti_{0.5}Si_{0.7}P_{0.1}$ | 0.085 | 525 | 54.6 |
| 70 | $Ba_{1.5}Fe_{10.5}Co_{0.75}Ti_{0.55}Sn_{0.2}P_{0.2}$ | 0.071 | 730 | 54.3 |
| 71 | $Ba_{1.3}Fe_{10.5}Co_{1.0}Ti_{0.3}W_{0.2}P_{0.02}$ | 0.074 | 616 | 55.5 |
| 72 | $Ba_{1.1}Fe_{11.0}Co_{0.2}Ti_{0.5}Mo_{0.15}Zr_{0.3}$ | 0.081 | 653 | 55.5 |
| 73 | $Ba_{1.1}Fe_{10.5}Co_{0.65}Ti_{0.75}Si_{0.4}W_{0.1}Zr_{0.1}$ | 0.073 | 618 | 56.0 |
| 74 | $Ba_{1.1}Fe_{10.5}Co_{0.8}Ti_{0.4}Sn_{0.4}W_{0.2}P_{0.05}$ | 0.075 | 638 | 55.1 |

What is claimed is:

1. A magnetic powder for magnetic recording which has an average particle diameter of 0.01 to 0.3 micrometers and is represented by the following general composition formula $$Fe_aCo_bTi_cM^I_dM^{II}_eM^{III}_fO_g$$

wherein $M^I$ represents at least one metal element selected from Ba, Sr, Ca and Pb, $M^{II}$ represents at least one element selected from Si, Sn, Mo and W, $M^{III}$ represents at least one element selected from Ni, Cu, V, Zr, La, Ce, Nd, Sm, Mg, P, Cr, In, Tl and Ge, a, b, c, d, e, f and g respectively represent the numbers of Fe, Co, Ti, $M^I$, $M^{II}$, $M^{III}$ and O atoms, a is a number of 8 to 11.8, b is a number of 0.05 to 2.0, c is a number of 0.05 to 2.0, d is a number of 0.5 to 3.0, e is a number of 0.001 to 3.0, and f is a number of 0.001 to 3.0, and g is the number of oxygen atoms satisfying the atomic valences of the other elements.

2. The magnetic powder of claim 1 wherein a is 8 to 11.8, b is 0.1 to 1.5, c is 0.1 to 1.5, d is 0.8 to 2.0, e is 0.005 to 2.0, f is 0.005 to 2.0, and g is the number of oxygen atoms satisfying the atomic valences of the other elements.

* * * * *